United States Patent [19]

Barry et al.

[11] Patent Number: 4,791,482
[45] Date of Patent: Dec. 13, 1988

[54] OBJECT LOCATING SYSTEM

[75] Inventors: Robert F. Barry; Samuel Kang, both of Monroeville, Pa.

[73] Assignee: Westinghouse Electric Corp., Pittsburgh, Pa.

[21] Appl. No.: 11,988

[22] Filed: Feb. 6, 1987

[51] Int. Cl.$^4$ .............................................. H04N 7/18
[52] U.S. Cl. ................................. 358/107; 358/93; 901/47; 364/559
[58] Field of Search ......................... 358/107, 101, 93; 301/47; 364/559, 459, 516; 356/363, 375

[56] References Cited

U.S. PATENT DOCUMENTS

| | | | |
|---|---|---|---|
| 3,069,654 | 12/1962 | Hough et al. | |
| 3,959,771 | 5/1976 | Uno et al. | 340/146.3 H |
| 4,105,925 | 8/1978 | Rossol et al. | 250/561 |
| 4,115,803 | 9/1978 | Morton | 358/107 |
| 4,187,051 | 2/1980 | Kirsch et al. | 414/744 |
| 4,287,769 | 9/1981 | Buckley | 73/627 |
| 4,295,740 | 10/1981 | Sturges, Jr. | 356/152 |
| 4,316,189 | 2/1982 | Sturges, Jr. | 340/870.34 |
| 4,326,155 | 4/1982 | Griebeler | 318/576 |
| 4,367,465 | 1/1983 | Mati et al. | 340/707 |
| 4,377,810 | 3/1983 | Wolff | 340/707 |
| 4,396,945 | 8/1983 | DiMatteo et al. | 358/107 |
| 4,405,238 | 9/1983 | Grobman et al. | 356/401 |
| 4,437,114 | 3/1984 | LaRussa | 358/101 |
| 4,438,567 | 3/1984 | Raiha | 33/286 |
| 4,488,173 | 12/1984 | DiMatteo et al. | 358/107 |
| 4,492,847 | 1/1985 | Masaki et al. | 219/124.34 |
| 4,494,139 | 1/1985 | Shima et al. | 358/101 |
| 4,550,374 | 10/1985 | Meshman et al. | 364/559 |
| 4,567,348 | 1/1986 | Smith et al. | 219/124.34 |
| 4,628,469 | 12/1986 | White | 358/107 |
| 4,672,562 | 6/1987 | Egli et al. | 358/107 |
| 4,672,564 | 6/1987 | Egli et al. | 358/107 |
| 4,685,054 | 8/1987 | Manninen et al. | 364/559 |

FOREIGN PATENT DOCUMENTS

| | | |
|---|---|---|
| 0157299 | 10/1985 | European Pat. Off. |
| 26706 | 2/1982 | Japan |
| 241612 | 10/1986 | Japan |

OTHER PUBLICATIONS

Bartelt et al., "Simultaneous Height and Slope Measurement of Three-Dimensional Surfaces"; Optics Communications, vol. 52, No. 6; Jan. 1985; pp. 380-383.

Livnat et al., "Slope and Deformation Mapping by Grating Projection Technique"; Optical Engineering, vol. 24, No. 1; Jan./Feb. 1985; pp. 150-152.

Sobel, "Neighborhood Coding of Binary Images for Fast Contour Following and General Binary Array Processing", Computer Graphics and Image Processing, vol. 8; Aug. 1978; pp. 127-135.

Affinito et al., "Computer Controlled Robot with Ultrasonic Sensor", IBM Tech. Dis. Bulletin, vol. 18, No. 8, Jan. 1976, pp. 2665-2667.

Pavlidis, Algorithms for Graphi and Image Processing Computer Science Press, Rockville, Md., 1982, pp. 142-148.

Horn, Berthold Klaus Paul, Robot Vision, The MIT Electrical Engineering and Computer Science Series, The MIT Press, pp. 365-399.

Primary Examiner—James J. Groody
Assistant Examiner—John K. Peng
Attorney, Agent, or Firm—D. C. Abeles

[57] ABSTRACT

The invention projects a known geometry light source onto the surface of an object. A camera with a known distance and angular orientation with respect to the light source is used to capture the light source image on the object. The normal to the surface of the object is determined from the known size of the projected image, the angles of the intersecting lines in the projected image and the corresponding values in the received image. If a hole is to be located, the image projected is a cross and the center of the hole is determined by finding the end points of image line segments which correspond to hole edges. The center and surface normal define the location and orientation of the hole. The surface normal and the center of the hole are transformed into a robot coordinate system and a robot can be commanded to insert a bolt into the hole based on the values. The system can be used to map and measure a surface contour by determining normals and intersection points along the contour, calculating the distances between intersection points and summing these distances. Relative angles between surfaces can be determined from the normals. An object can be identified by comparing the relative angles between the surfaces of the object to relative angles for known reference objects. A Gaussian image can be produced by taking normals over the surface of the object and plotting these in a spherical coordinate system and used for object identification.

23 Claims, 11 Drawing Sheets

OBJECT LOCATING SYSTEM

BACKGROUND OF THE INVENTION

1. Field of the Invention

The present invention is directed to an object locating system to be used for robotic machinery and, more particularly, to a system which locates an object by determining a normal to the surface of the object and the intersection point of the normal with the surface.

2. Description of the Related Art

There is a need in robot applications to provide a system which will locate objects such as plates and locate holes in plates with a high degree of precision. For example, to put a bolt in a hole, it is necessary to locate the hole and approach the hole with the bolt from the proper direction with the bolt lined up along the axis of the hole. When the robot is to put the bolt in the hole, the first step is to locate the hole. Since robot vision systems generally require an extensive length of time to process a camera image, it is important that the equipment used to determine object location be simple and fast, so that overall system performance will be acceptable.

SUMMARY OF THE INVENTION

It is an object of the present invention to provide a simple, inexpensive object location system that operates rapidly.

It is another object of the present invention to provide a system which will accurately locate objects such as holes and object surfaces.

It is also an object of the present invention to provide a system that will map and measure the length of contours on an object.

It is an additional object of the present invention to provide a system that is capable of determining the relative angles of surfaces of objects.

It is a further object of the present invention to provide a system which will identify objects.

The above objects can be attained by a system that projects a known geometry image from a light source onto the surface of an object. A camera with a known distance and orientation with respect to the light source is used with an image storage device to capture the light source image on the object. The plane of the image on the object is determined by determining a normal to the surface of the object from the known geometrical relationships. If a hole is to be located, the image projected is a cross and the center of the hole is located. The center and surface normal define the location of the hole and its orientation. The surface normal and the center of the hole are transformed into a robot coordinate system and a robot can then be commanded to insert a bolt into the hole based on the known hole location and orientation. The system can also be used to map and measure surface contours of the object by calculating the distances between normals intersecting the contour and summing the distances. Relative angles between surfaces of the object can be determined from the surface normals. An object can be identified by comparing the relative angles between the surfaces of the object to relative angles for known reference objects. A Gaussian image map can be produced by taking normals over the surface of the object and plotting these in a spherical coordinate system. The Gaussian image can be compared to reference Gaussian images to identify the object.

These together with other objects and advantages which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
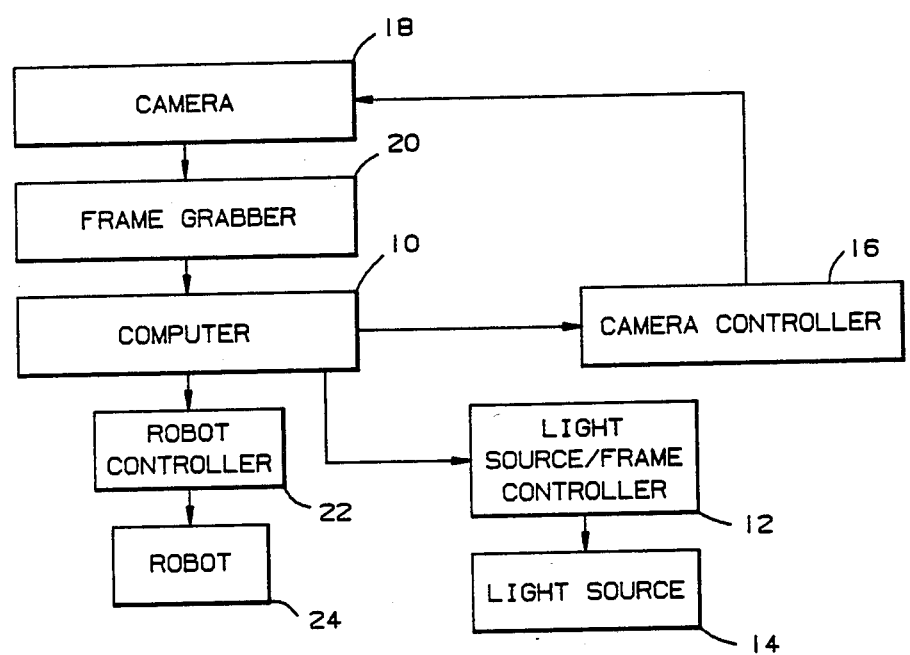
FIG. 1 is a schematic diagram of the components of the system according to the present invention.

A computer 10 such as an IBM PC/AT controls a light source/frame controller 12 such as a Unimate controller model Puma A-75 to project a light pattern from light source 14 onto the surface of an object, as illustrated in FIG. 1. The computer 10 through a camera controller 16, which can be another Unimate controller, controls the orientation and distance of camera 18 from the light source 14. A suitable self-focussing camera is a CCD Model 34X camera available from Pulinex. A frame grabber coupled to the camera, such as an Imaging Technology IT-100 device, captures the image of the light source on the object and provides the camera image to the computer 10. The computer 10 calculates the location of the object and can send a movement command to a robot controller 22 which moves a robot 24 to the object of interest.

Figure 2:
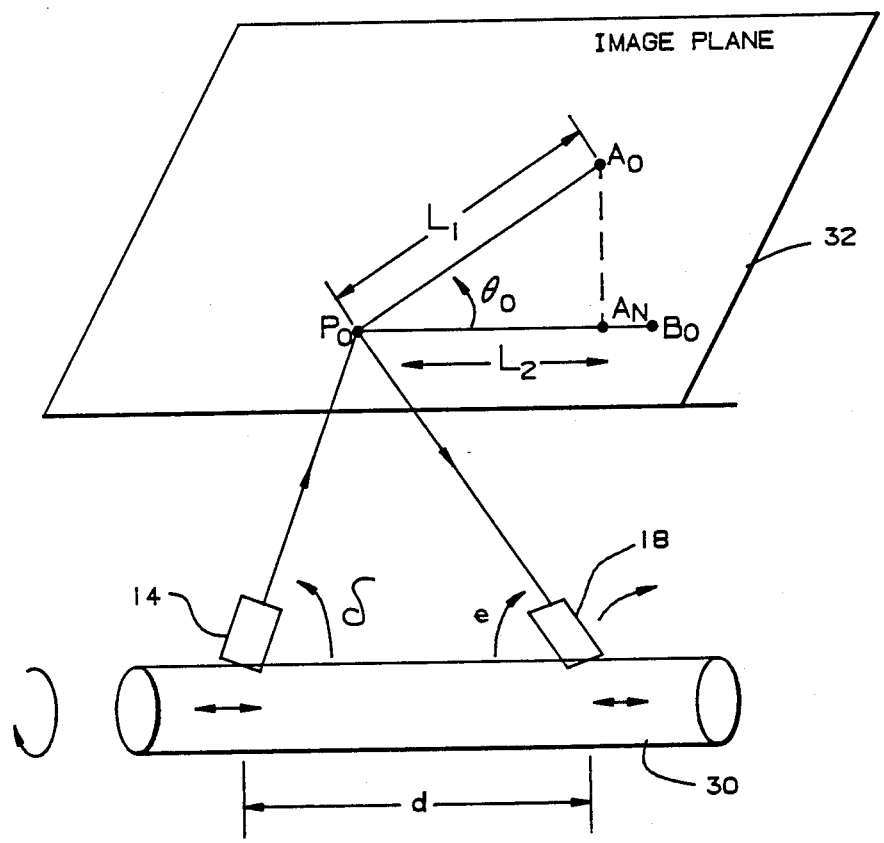
FIG. 2 illustrates the image detected by the camera 18 along with geometry of the present invention.

The camera 18 and light source 14, as illustrated in FIG. 2, are mounted on an indexable encoder equipped frame or track 30 which allows the frame 30 to be rotated, allows the light source to be moved along the frame 30 in both directions, allows the camera 18 to move in both directions along the frame 30, allows the camera 18 to be rotated, and allows all angles and distances to be recorded by computer 10. The camera 18 only rotates in the light source projection plane so that the camera 18 will always cross the light source image on the object. The angle δ between light source 14 and frame 30 is known because both the camera 18 and light source 14 are indexably controlled and this angle is preferably 90°. The distance d between the image surface of the camera 18 and the light source 14 is also known. The angle e between the camera 18 axis and the frame 30 is also known. It is possible to project several different types of images onto the object being viewed preferably using a laser light source and cylindrical mirrors, as described in U.S. Pat. No. 4,741,621, incorporated by reference herein, along with a lense to collimate each pattern and a half reflecting mirror to combine light patterns. An alternative is to use a noncoherent light source and a mask. It is also possible to add a focusing lense to the mask arrangement if a ranging device, such as an ultrasonic distance sensor is used to adjust focus.

One type of projected image is an L-shaped image which, when projected onto the surface of the object can produce a distorted L-shape in the image plane 32 of the camera 18, as illustrated in FIG. 2. The image examined by the computer 10 is a matrix of ones and zeros where the ones represent the reflected image. From the matrix, the angles $\Theta o$, the intersection point Po, the endpoints Ao, Bo, the intersection point An and the lengths L1 and L2 can be determined. From this camera image, the following values can be determined independent of any scale value:

$$\cos(\Theta o) = PoAn/AoPo \quad (1)$$

$$No = PoBo/AoPo = L2/L1 \quad (2)$$

where No is ratio of line lengths and $\Theta o$ is the angle between the lines in the image plane.

Figure 3:
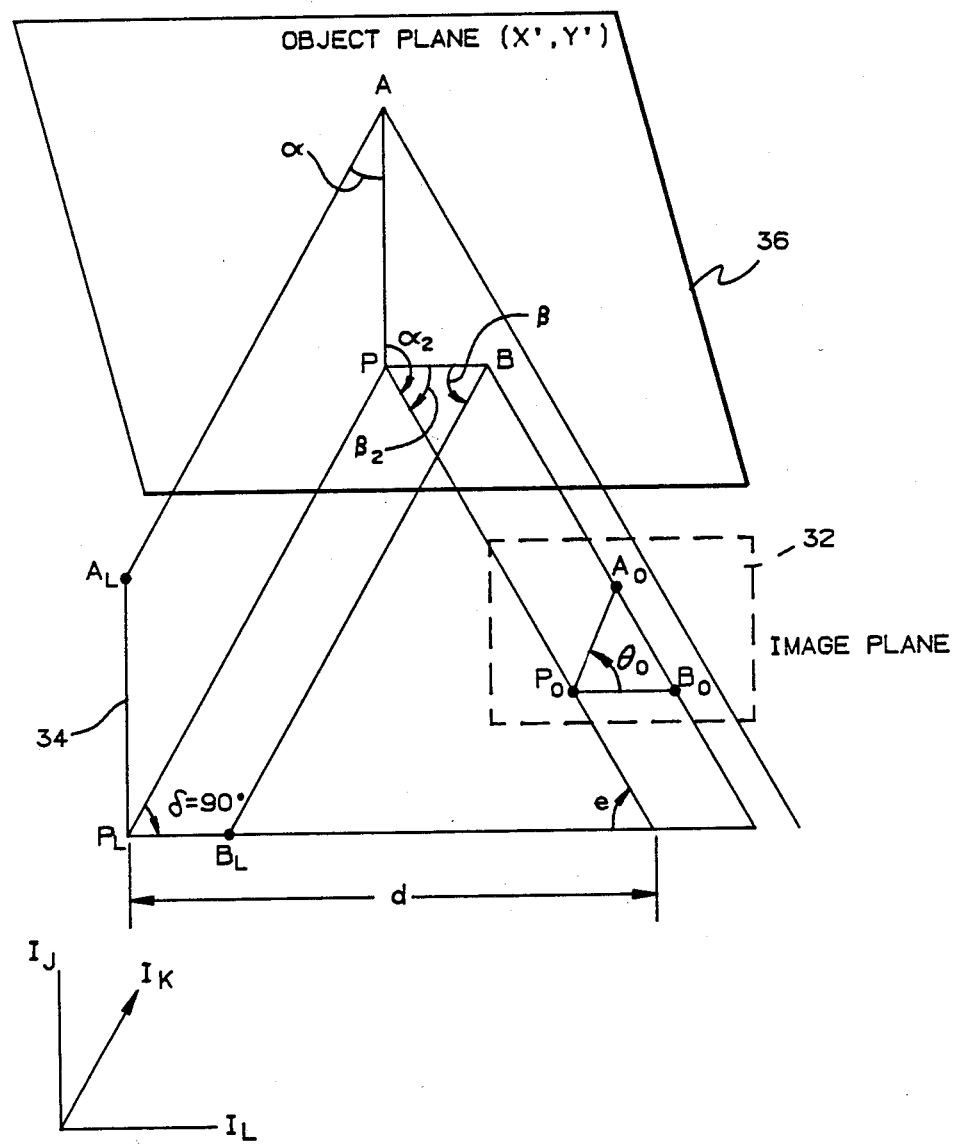
FIG. 3 depicts values from which a surface normal is determined.

From the known relationship between the image plane 32 image and the known size of the light source image 34 projected onto the object plane 36, as illustrated in FIG. 3, the object plane and its normal can be determined. The object plane is determined by two angles $\alpha 2$ and $\beta 2$ and the real coordinates of point PL (the location of the light source) (o,o,o), the camera location (d,o,o) and the location of Po on the object (o,o,d|tan|e). The normal is determined in accordance with the following equations:

$$\cos \alpha 2 = -(\sin e)/(1+\cos^2 e \tan \Theta o) \quad (3)$$

where $\alpha 2$ is indicated in FIG. 3, e is the angle between the camera 18 and frame 30;

$$\cos \beta 2 = \quad (4)$$

$$(\sin \Theta - No \sin e)/(\sqrt{No_2 - 2No \sin e \sin \Theta o + \sin^2 \Theta o})$$

$$\tan \alpha = \cos e \tan \Theta o \quad (5)$$

where $\alpha$ is shown in FIG. 3; and $$\tan \beta = (\cos e \sin \Theta)/(No - \sin e \sin \Theta o) \quad (6)$$

where $\beta$ is shown in FIG. 3.

$$x/\tan \beta + y/\tan \alpha + (d \tan e - z) = 0 \quad (7)$$

defines the object plane and the normal is as follows:

$$\text{Normal} = \quad (8)$$

$$(1/\sqrt{1/\tan^2 \alpha + 1/\tan^2 \beta + 1})(1/\tan\beta 1i + 1/\tan\alpha 1j - 1k)$$

where 1i, 1j and 1k are unit vectors.

From the normal to the object surface, all of the points in the image plane can be transformed into points on the object plane in accordance with the following transformation equations:

$$\begin{bmatrix} x' \\ y' \end{bmatrix} = q \begin{bmatrix} a11 & a12 \\ a21 & a22 \end{bmatrix} \begin{bmatrix} xo \\ yo \end{bmatrix} \quad (9)$$

x' and y' correspond to points on the object plane while xo and yo are points on the image plane and q is a scaling factor;

$$a11 = (\sqrt{1 + \cos^2 e \tan^2 \Theta o})/(\cos e \sec \Theta o) \quad (10)$$

$$a12 = (\sin e/\sin \Theta o)/\sqrt{1 + \cos^2 e} \quad (11)$$

$$a21 = 0 \quad (12)$$

$$a22 = \quad (13)$$

$$(No \sin e - \sin \Theta o)/(\sqrt{No^2 - 2No \sin e \sin \Theta o + \sin^2 \Theta o}) \cdot$$

$$(1 \cdot/\sin \Theta o \cdot (\sqrt{1 - x^2}).$$

$$x = (No \cos e)/(No^2 - 2No \sin e \sin \Theta o + \quad (14)$$

$$\sin 2\Theta o)(\cos e \sec \Theta_o)/(\sqrt{1 + \cos^2 e \tan^2 \Theta_o})$$

If the coordinates from the object plane need to be transformed into a real coordinate system such as a robot coordinate system where the geometric relationship between the frame 30 and the robot coordinate system is known, the following equations can be used:

$$\begin{bmatrix} x \\ y \end{bmatrix} \begin{bmatrix} \sin\beta & -\sin\beta/\tan\Theta \\ 0 & \sin\alpha/\sin\Theta \end{bmatrix} \begin{bmatrix} x' \\ y' \end{bmatrix} \quad (15)$$

$$z = (x/\tan\beta) + (y/\tan\alpha) + (d \tan e) \quad (16)$$

where x, y and z are coordinates in the robot coordinate system. It is, of course, possible to produce transformation equations for a transformation directly from the image plane coordinate system to the real or robot coordinate system, and such a transform would merely be the combination of the above transformations into a single transformation.

The scaling factor q set forth in equation (9) above can be determined in accordance with the following equation, since the distance between Po and Bo in FIG. 2 can be measured in pixel units and the distance P1 and B1 for the light source is known.

$$q = \frac{PB}{PoBo} = \frac{PB}{L2} \quad (17)$$

which is the ratio of the line lengths. Since PoBo can be measured in pixel units and $PB = (a/\sin\beta)$, then $q = (a/\sin\beta)/L2$ where a is the original beam width PL BL.

Figure 4A:
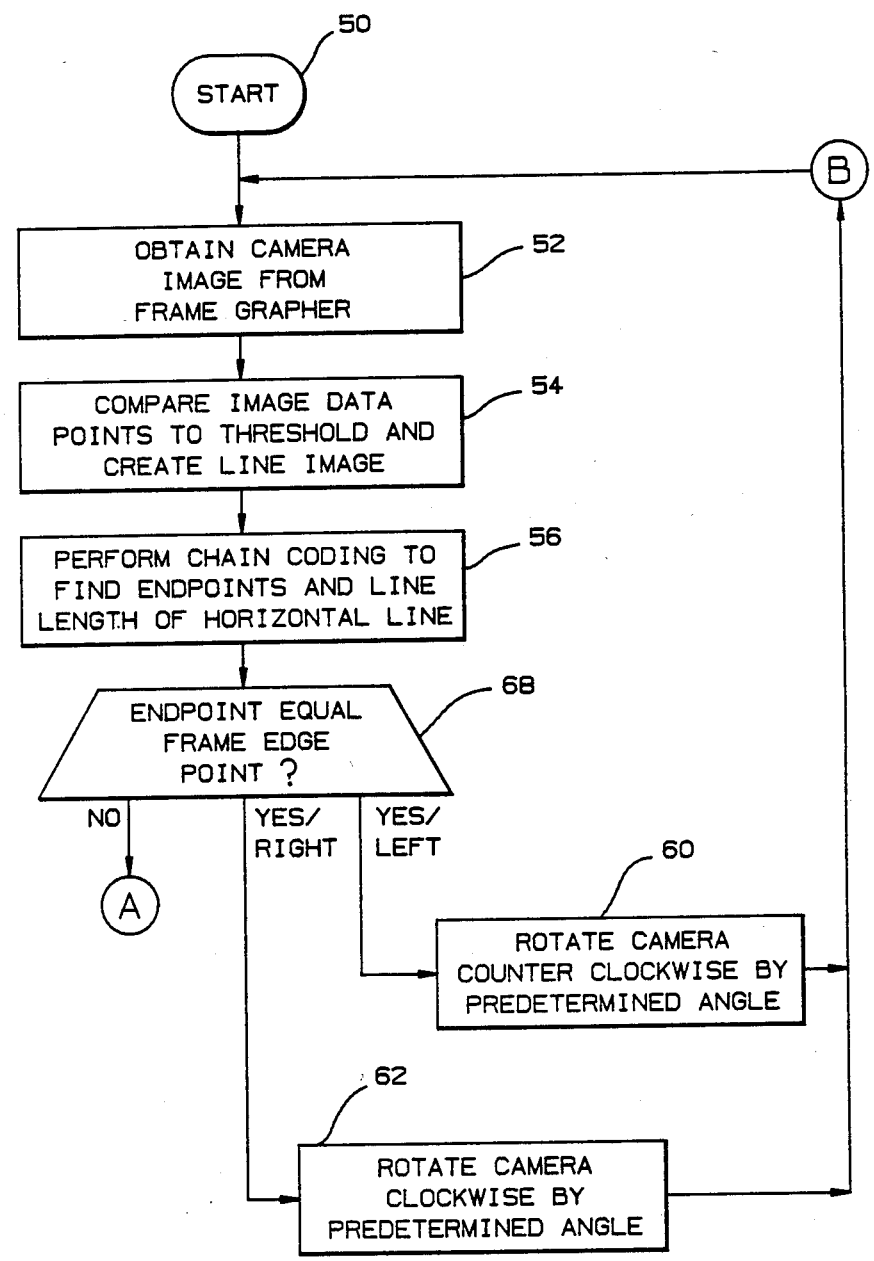
FIGS. 4A and 4B depict a flowchart of a process for determining the normal to a surface.
Figure 4B:
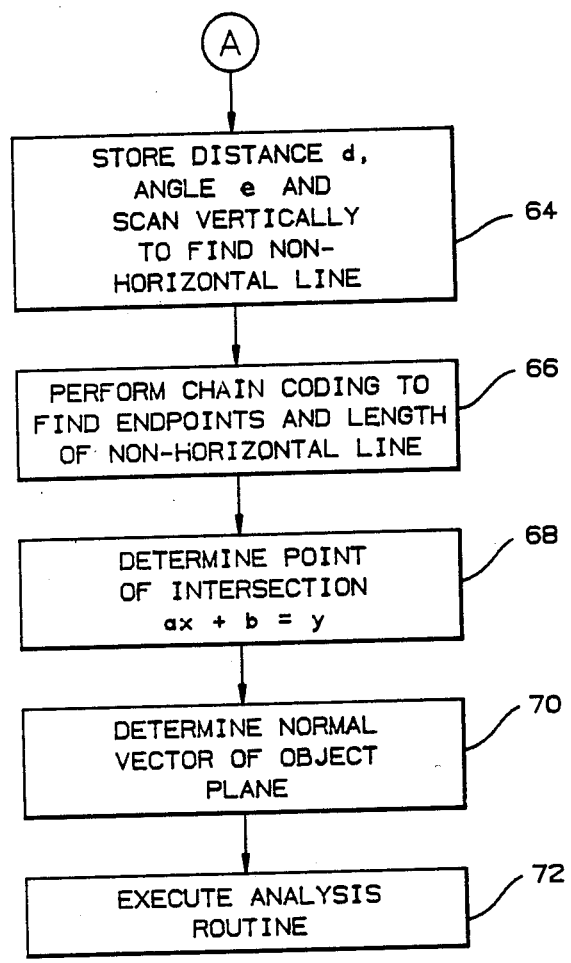

FIGS. 4A and 4B depict a flowchart of a process performed by computer 10 to determine the surface normal. First, the computer obtains 52, the camera image from the frame grabber 20. This image is in the form of a matrix of gray scale values for each pixel produced by the camera 18. The gray scale array is compared 54 one data point at a time to a threshold. If the gray scale value is above the threshold, a corresponding bit of a line image array is set to a value of one, indicating the existence of a line point at the corresponding position in the camera image. If the gray scale value is below the threshold, a zero is entered in the line image array indicating darkness.

Once the image is transformed into a binary representation, the horizontal image lines on which the horizontal line of the object image should appear are scanned 56 using a chain coding algorithm to find the endpoints and the line length of the horizontal line. An appropriate chain coding routine can be found in Pavlidis, *Algorithms for Graphic and Image Processing*, Computer Science Press, Rockville, Md, 1982, incorporated by reference herein. Since the camera scans a constant plane with reference to the light source plane, the horizontal line should appear at approximately the same fixed location (row) in the camera image at all times. This allows the chain coding routine to begin scanning from a known point in the camera image.

When the endpoints of the horizontal line are found, the endpoints are compared 58 to the camera frame edge. If the endpoints correspond to the camera frame edge, the camera is rotated 60 or 62 by a predetermined angle depending on which edge is coincident with the endpoint. This rotation loop forces the camera 18 to rotate until the horizontal line segment of the image is completely within the frame of the camera image. Once the image of the horizontal line is completely within the camera image frame, the camera 18 is further rotated to center the image in the camera frame. This can be accomplished by calculating the distances between end points of the horizontal line and the frame edge and rotating the camera until the distances are equal. Once the image is centered within the camera frame, the camera is activated to self fine focus. As a consequence of the self-focus, the distance between the camera and the image on the object is known.

Next, the computer scans 64 the camera image to find the non-horizontal line. This vertical scanning can be accomplished in several different ways. For example, one end point of the line can be used as a horizontal index for a vertical scan of the image array which examines each pixel representation data point vertically until a light point is encountered. If the scan starting with the endpoint does not detect an image point, the horizontal coordinate is indexed and another vertical scan occurs.

Once a single image point is found during the vertical scanning, the chain coding algorithm is performed 66 again to determine the endpoints and line length of the non-horizontal line. Once the line length and endpoints of both the horizontal and non-horizontal lines are determined, the intersection point of the two lines can be determined 68 in accordance with the well-known slope intersect equation, even if the intersection point happens to fall in a hole or other cavity and is therefore not directly detectable.

An alternative to the method discussed above for determining the intersection point is a Hough transformation described in detail in U.S. Pat. No. 3,069,654.

Once the intersection point is determined, the normal to the surface can be calculated 70 in accordance with the equations previously discussed. After the intersection point is transformed into the object plane coordinate system, the normal and transformed intersection point define the location and orientation of the object surface. After the normal and intersection point in the object plane are determined, any of several different analysis routines can be executed 72.

For image interpretation tasks, the system is ideally suited for transforming object coordinates into another coordinate system, so that template matching is simplified.

Figure 5:
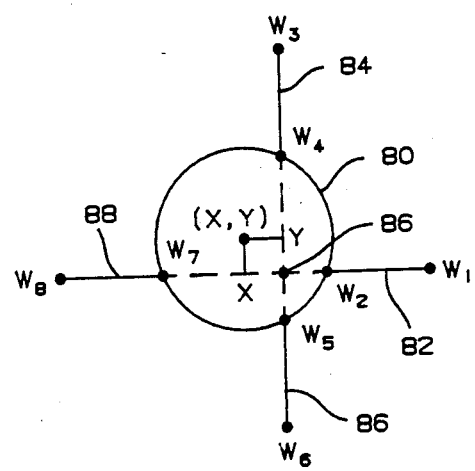
FIG. 5 illustrates a hole 80.
Figure 6:
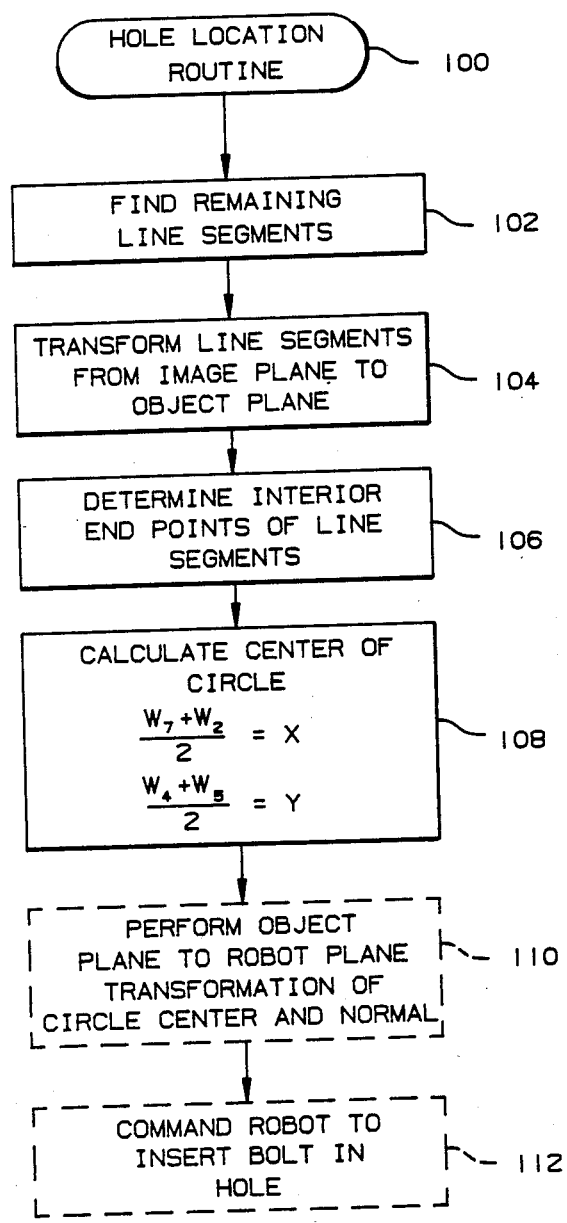
FIG. 6 depicts a hole location routine.

Another of the possible analysis routines is a hole location routine which determines the center and orientation of a hole 80, such as illustrated in FIG. 5. In this routine, the preferred light source image is a cross, however, any image that provides at least three legs that intersect will be acceptable. It is assumed for this routine that the hole 80 is located in a generally predictable location such that the projected cross will encounter the hole 80. Since the location and orientation of the line segments 82 and 84 and the intersection point 86 of the two line segments 82 and 84 are known, it is possible to continue scanning in the camera image along the known lines to detect line segments 86 and 88 on the other side of the hole 80. Once these segments are found 102, the routine of FIG. 6 transforms 104 the segments 82-88, in accordance with the equations previously discussed, into segments in the object plane, so that the hole 80 will appear in a normal perspective, allowing standard circle equations to be used during calculations instead of the ellipse equations which would have to be used otherwise.

Next, the interior endpoints of the line segments are determined 106 by, for example, comparing horizontal coordinates of the horizontal line segments 82 and 88 and designating the two closest points W2 and W7 as interior points and performing a similar operation with respect to the vertical segments 84 and 86 to obtain the interior points W4 and W5. It is also possible to find the interior points by first executing an edge finding routine, mentioned later and then comparing the hole edge to line segment coordinates. Coincidence between coordinates indicates an interior endpoint.

The center (x, y) of the hole 80 is then calculated 108 using the appropriate coordinate values of the points W2, W4, W5 and W7.

The center (x, y), along with the surface normal, define the location and orientation of the hole 80. From the center and at least one intersection point, for example, W2, the radius and diameter of the hole 80 can be determined.

When the geometric relationship between the frame 30 and a robot coordinate system is known, the computer 10 can perform 110 a transformation from the object plane to the robot coordinate system to obtain the appropriate values from the perspective of the robot. The computer 10 can then command 112 the robot 24 through the robot controller 22 to insert an appropriate size bolt into the hole 80 along the known normal towards the center of the hole 80. Since the three-dimensional coordinates of the center of the hole 80 are known, the computer 10 can also appropriately command the robot 24 to begin spinning the bolt as it approaches the hole 80. The format of such a command and a description of how the command is communicated to the robot controller 22 can be found in the operating manual for the robot controller 22 and the details of such are within the ordinary skill in the art.

Figure 7:
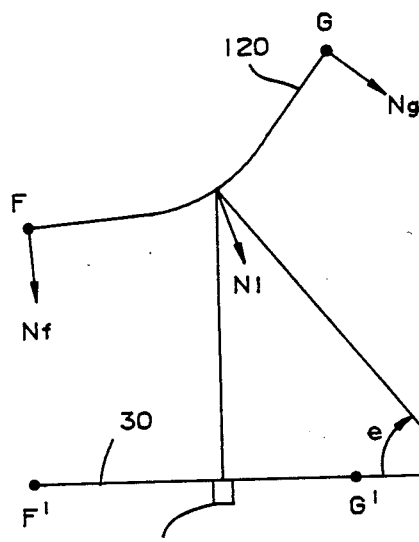
FIG. 7 illustrates the scanning of a contour to map a contour 120 and determine its length.
Figure 8:
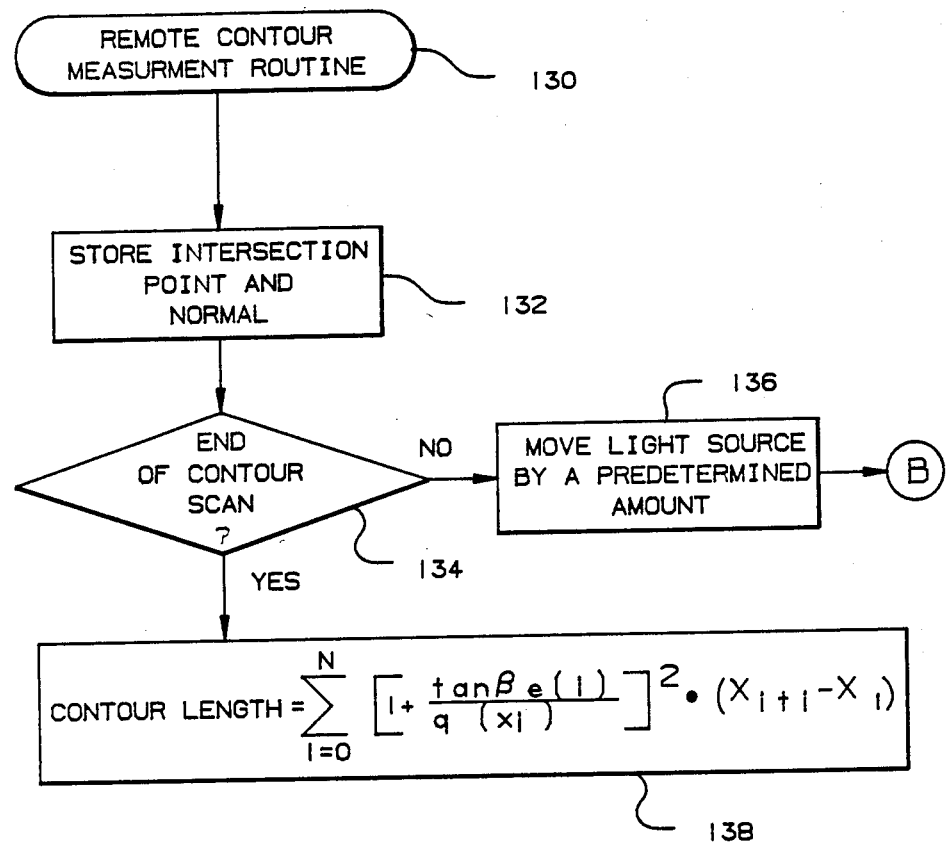
FIG. 8 depicts a contour length determination routine.

FIG. 7 depicts a contour mapping and measurement method whereby a contour F-G 120 is mapped and measured by moving the light source 14 from point F' to point G' along the frame 30 while determining the normals and intersection points of normals on the surface 120. The intersection points provide mapping points for the contour 120. The distances between the intersection points can be calculated and summed to determine the length of the contour 120. FIG. 8 illustrates a routine for performing the contour mapping and length measurement. After the normal is determined, the intersection point and normal are stored 132 followed by a determination 134 concerning whether the end point G' has been reached. If not, the light source is moved 136 by a predetermined amount along the frame 30. If the scan endpoint G' has been reached, the contour length is calculated 138 by a simple summation.

Figure 9:
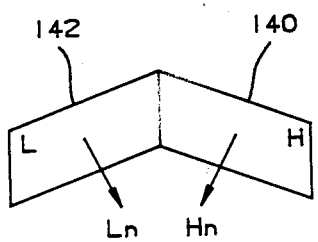
FIG. 9 illustrates a method for determining relative angles between surfaces.
Figure 10:
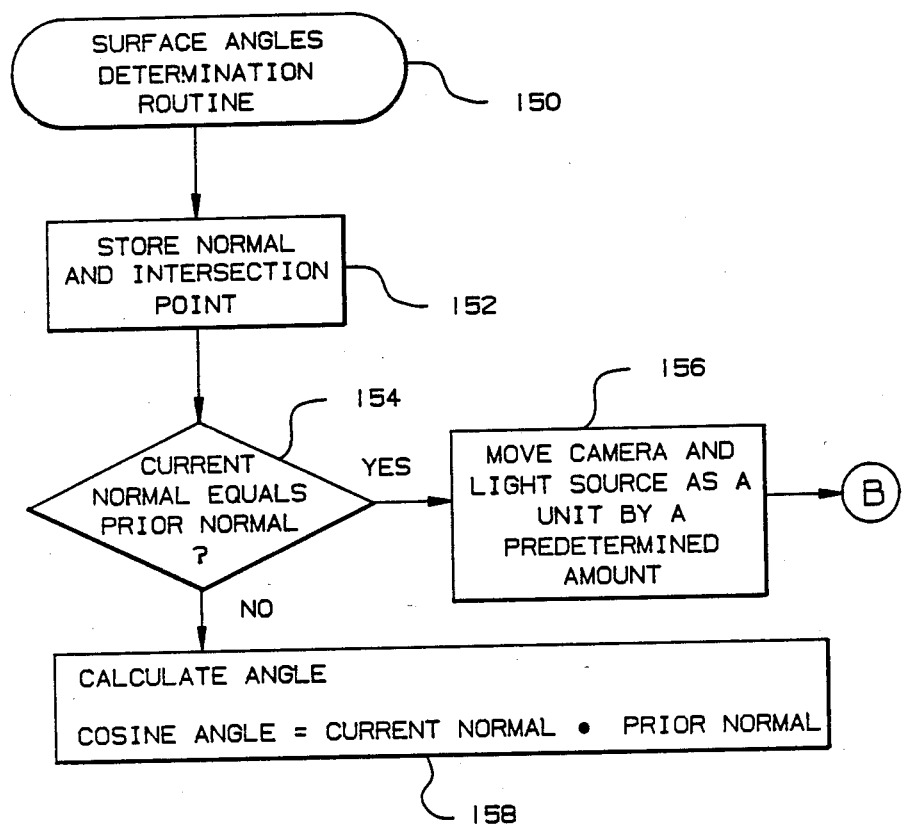
FIG. 10 depicts a routine for relative angle determination.

It is also possible once the normal Hn for a first surface 140 is determined, to determine the normal Ln for a second surface 142, as illustrated in FIG. 9, by moving the camera 18 and light source 14 onto the second surface 142. The angle between the two surfaces 140 and 142 can be determined from the normals. During this process, illustrated in FIG. 10, as the camera 18 is moved from one surface to another surface, the normal for the current point is saved 152 and then compared 154 with the prior normal. If the normals are equal, the camera 18 and light source 14 are moved 156 as a unit by a predetermined amount. If the normals are not equal then the angle between the two surfaces is calculated 158.

Figure 11:
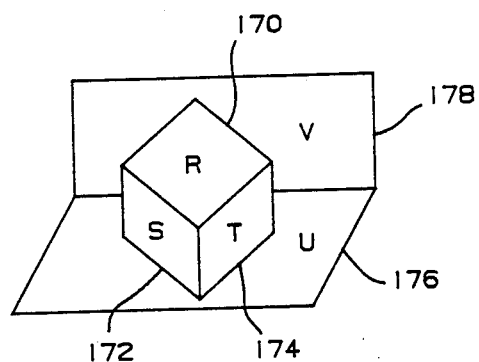
FIG. 11 illustrates an object with several surfaces.
Figure 12:
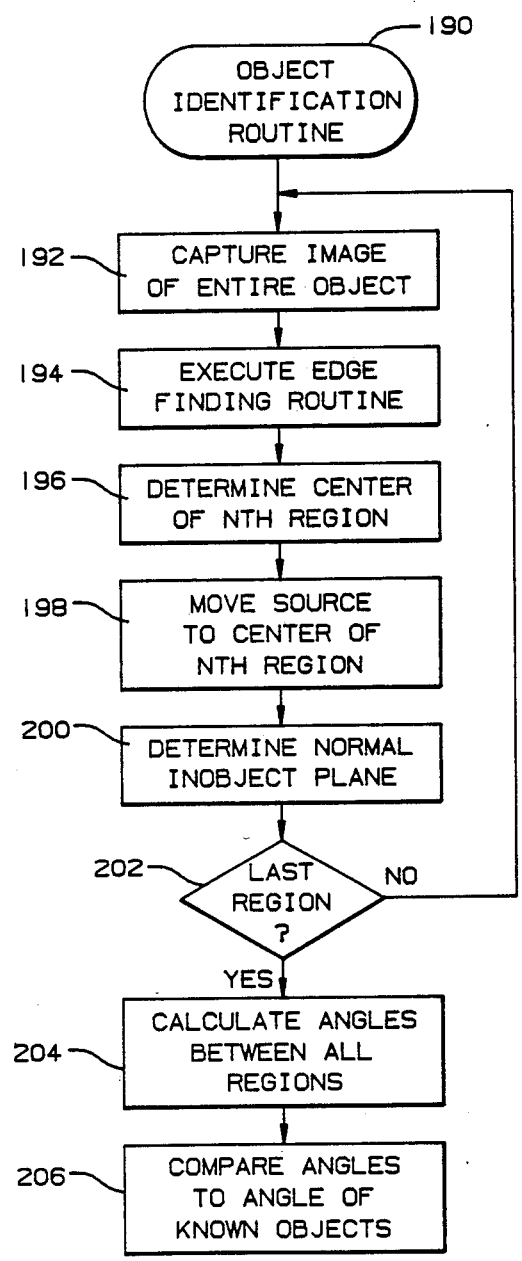
FIG. 12 depicts a routine for identifying an object using relative angles.

If the normals for a plurality of surfaces R-V, as illustrated in FIG. 11, are known, the identity of the object can be determined by comparing the relative angles between the surfaces to relative angles for reference objects. A routine for identifying an object from surface normals is illustrated in FIG. 12. In this routine, the camera 18 must be in a position to capture 192 the image of the entire object. After the image of the entire object is captured, an edge finding routine such as described in Sobel, "Neighborhood Coding of Binary Images for Fast Contour Following and General Binary Array Process", CGIP, No. 8, Aug., 1978, pp. 127–135, can be executed 194 to determine or identify the regions of the object being examined.

Next, well-known center determination algorithms can be executed 196 to locate the center of each region and the light source 14 is then moved 198 to the center of a region. The normal for that region is determined 200 using the procedure of FIGS. 4A and 4B. If the last region has been examined 202, the routine calculates 204 the angles between all the regions per the equation of FIG. 10 and then compares 206 the relative angles of the object with the relative angles of known reference objects. When the relative angles are equal, the object is identified. By using the relative angles of the objects for object identification, object size and orientation information are not necessary.

Figure 13:
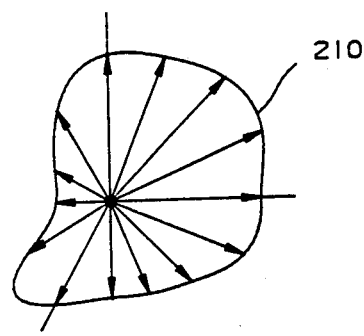
FIG. 13 illustrates a Gaussian representation of an object.

It is also possible to determine the Gaussian distribution of the normals for an object which then can be used to identify the object as described in Horne, *Robot Vision*, McGraw-Hill, New York, 1986. The Gaussian image is determined by scanning the object three-dimensionally and recording the surface normals for the object. The surface normals are then plotted in a spherical coordinate system, as illustrated in FIG. 13, where the coordinate value at each angle in the spherical coordinate system represents the magnitude or number of normals determined for the object in this direction.

Figure 14:
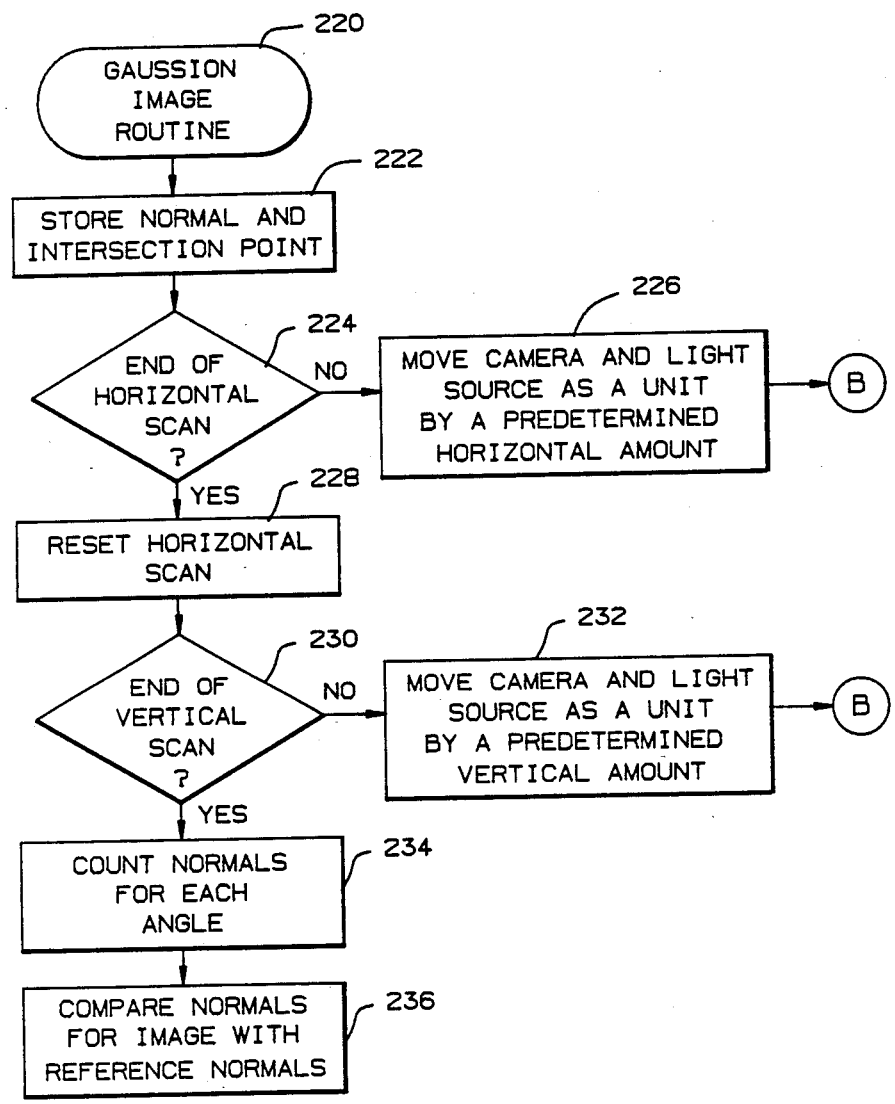
FIG. 14 depicts a routine for identifying an object using a Gaussian representation.

A routine for identifying an object using a Gaussian map image is illustrated in FIG. 14. The Gaussian map image is a map of the densities of normal vectors for the surfaces of the object. Once the normal and intersection point of a particular position of the camera and light source are determined, they are stored 222 followed by determination 224 concerning whether the horizontal scan of the object has been completed. If the horizontal scan has not been completed, the camera 18 and light source 14 are moved 226 as a unit by a predetermined amount. If the horizontal scan has been completed, the camera is reset 228 to the beginning of the orizontal scan so that another horizontal scan can begin, if all vertical scans have not been finished. A determination is then made 230 concerning whether the end of the vertical scan has been reached and, if not, the camera 18 and light source 14 are moved verticaly 232 by a predetermined amount. If the scans have been completed, indicating that the object has been completely scanned, the normals are totaled 234 for each angle in the spherical coordinate system. Then the normal totals for each angle of the object are compared 236 with reference normals for reference objects at corresponding angles. If the normal totals are substantially the same, the object has been identified.

Other routines can also be provided to transform all image coordinates into coordinates in the object or robot coordinate systems to provide same to an operator for viewing or a robot for possibly picking up the object. It is possible to substitute a single point scanning light source if the frame grabber is used to combine plural images. It is also possible to allow the angle δ to be other than 90°. Another possible use for the present invention is in a position identification device where a touch sensitive screen can be used to input real coordinates of an object, thereby defining the location of the object and its orientation in a real coordinate system.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described and, accordingly, all suitable modifications and equivalents may be resorted to, falling within the scope of the invention.

We claim:

1. An object location method, comprising the steps of:
    (a) projecting a light pattern onto the object with a light source;
    (b) digitizing the light pattern reflected from the object using a camera, where the camera and the light source are in a known geometric relationship to each other; and
    (c) locating and orienting the object in space by determining a normal to a surface of the object.

2. An object location method, comprising the steps of:
    (a) projecting a light pattern of at least two intersecting lines onto the object with a light source;
    (b) digitizing the light pattern reflected from the object using a camera, where the camera and the light source are in a known geometric relationship to each other, comprising the steps of:
        (b1) comparing the camera image point by point to a threshold; and
        (b2) chain coding the image to determine end points of the lines; and (c) locating the object by determining a normal to a surface of the object.

3. A method as recited in claim 2, wherein step (b) includes rotating the camera until the entire light pattern is in the camera image field.

4. An object location method, comprising the steps of:
(a) projecting a light pattern of at least two intersecting lines onto the object with a light source;
(b) digitizing the light pattern reflected from the object using a camera, where the camera and the light source are in a known geometric relationship to each other; and
(c) locating the object by determining a normal to a surface of the object, comprising:
  (c1) determining the intersection of the two lines; and
  (c2) determining the normal to the surface of the object using the known geometric relationship between the light source and the camera.

5. A method as recited in claim 4, wherein the geometric relationship between the light source/camera and an arbitrary coordinate system is known and said method further comprises transforming the normal into a normal in the arbitrary coordinate system.

6. An object location method, comprising the steps of:
(a) projecting a cross light pattern onto the object with a light source where the object includes a hole;
(b) digitizing the light pattern reflected from the object using a camera, where the camera and the light source are in a known geometric relationship to each other;
(c) locating the object by determining a normal to a surface of the object;
(d) finding all line segments of the cross;
(e) transforming the line segments into the object plane;
(f) determining the interior end points of each line segment; and
(g) determining the center of the hole.

7. A method as recited in claim 6, further comprising:
(h) transforming the center and normal into a robot coordinate system; and
(i) commanding the robot to approach the transformed center of the hole along the transformed normal.

8. An object location method, comprising the steps of:
(a) projecting a light pattern onto the object with a light source;
(b) digitizing the light pattern reflected from the object using a camera, where the camera and the light source are in a known geometric relationship to each other;
(c) locating the object by determining a normal to a surface of the object by determining an intersection of the normal with a surface of the object;
(d) moving the light source toward the camera by a predetermined amount;
(e) determining another normal and intersection; and
(f) repeating steps (d) and (e) until a contour of the object has been mapped by the intersections.

9. A method as recited in claim 8, further comprising (g) calculating the length of the contour from the intersections.

10. An object location method, comprising the steps of:
(a) projecting a light pattern onto the object with a light source;
(b) digitizing the light pattern reflected from the object using a camera, where the camera and the light source are in a known geometric relationship to each other;
(c) locating the object by determining a normal to a surface of the object;
(d) moving the camera and light source by a predetermined amount;
(e) determining another normal;
(f) comparing the normals of steps (c) and (e);
(g) repeating steps (d)–(f) when the normals are equal;
(h) calculating a relative angle between the normals when the normals are not equal.

11. A method as recited in claim 10, wherein step (b) includes defining object regions by determining edges of the object and said method further comprises:
(i) repeating steps (d)–(h) over all the object regions;
(j) comparing the calculated relative angles to known relative angles for known objects and identifying the object when the calculated and known relative angles for a known object are substantially identical.

12. A method as recited in claim 10, further comprising:
(i) repeating steps (d)–(h) for the entire object;
(j) counting the normals at each angle in a spherical coordinate system producing a Gaussian image of the object.
(k) comparing the Gaussian image with known Gaussian images for known objects and identifying the object when the Gaussian image and a known Gaussian image are substantially identical.

13. A hole location method, comprising the steps of:
(a) projecting a cross light pattern of intersecting lines onto the object with a light source;
(b) digitizing the light pattern reflected from the object using a camera where the camera and light source are in a known geometric relationship to each other;
(c) comparing the camera image point by point to a threshold;
(d) chain coding to determine end points of the lines;
(e) rotating the camera until the entire light pattern is centered in the camera image field if the end points correspond to a camera frame edge;
(f) determining the intersection point of the two lines;
(g) determining the normal to the surface of the object using the known geometric relationship between the light source and the camera;
(h) finding all line segments of the cross;
(i) transforming the line segments into the object plane;
(j) determining the interior end points of each line segment;
(k) determining the center of the hole;
(l) transforming the center and normal into a robot coordinate system; and
(m) commanding a robot to approach the center of the hole along the normal.

14. An apparatus for locating an object, comprising:
a light source projecting a predetermined light pattern having intersecting lines where one of the lines lies in a predetermined plane;

a rotatable camera having a rotational axis rotating in the predetermined plane and receiving an image of the light pattern reflected off the object;
a frame carrying said light source and said camera in a fixed geometrical relationship;
camera control means for controlling camera rotation; and
location determination means for determining the location of the object by determining a normal to the surface of the object from the image and the fixed geometrical relationship between said light source and said camera.

15. An apparatus as recited in claim 14, wherein said normal determination means comprises:
image digitizing means for digitizing the image; and
line finding means for finding the end points of the lines in the digitized image;
intersection determination means for finding the intersection of the lines in the image; and
normal means for determining the normal to the object from the fixed geometric relationship and the intersection.

16. An apparatus as recited in claim 14, wherein said normal determination means further includes rotating means for rotating the camera until the image of the light pattern is completely within the camera viewing range.

17. An apparatus for locating an object with a hole, said apparatus comprising:
a light source projecting a predetermined cross light pattern overlapping the hole and having intersecting lines where one of the lines lies in a predetermined plane;
a rotatable camera having a rotational axis rotating in the predetermined plane and receiving an image of the light pattern reflected off the object;
a frame carrying said light source and said camera in a fixed geometrical relationship;
camera control means for controlling camera rotation;
normal determination means for determining a normal to the surface of the object from the image and the fixed geometrical relationship between said light source and said camera, said normal determination means including:
center determination means for determining a center of the hole;
transformation means for transforming the normal and the center into a robot coordinate system; and
means for commanding movement to the transformed center along the transformed normal; and
a robot, operatively connected to said means for commanding, for moving to the transformed center along the transformed normal.

18. An apparatus for locating an object, said apparatus comprising:
a light source projecting a predetermined light pattern having intersecting lines where one of the lines lies in a predetermined plane;
a rotatable camera having a rotational axis rotating in the predetermined plane and receiving an image of the light pattern reflected off the object;
a frame carrying said light source and said camera in a fixed geometrical relationship;
camera control means for controlling camera rotation;
normal determination means for determining a normal to the surface of the object from the image and the fixed geometrical relationship between said light source and said camera
light source movement control means connected between said light source and said normal determination means; and
contour mapping means for mapping a contour of the object by moving the light source and determining intersections along the contour.

19. An apparatus as recited in claim 18, further including means for determining the length of the contour.

20. An apparatus for locating an object with at least two surfaces, said apparatus comprising:
a light source projecting a predetermined light pattern having intersecting lines where one of the lines lies in a predetermined plane;
a rotatable camera having a rotational axis rotating in the predetermined plane and receiving an image of the light pattern reflected off the object;
a frame carrying said light source and said camera in a fixed geometrical relationship;
camera control means for controlling camera rotation;
normal determination means for determining a normal to the surface of the object from the image and the fixed geometrical relationship between said light source and said camera; and
surface angle determination means for determining relative angles between the at least two surfaces.

21. An apparatus as recited in claim 20, further comprising means for comparing the relative angles with known relative angles for known objects to identify the object.

22. An apparatus for locating an object having surfaces, said apparatus comprising:
a light source projecting a predetermined light pattern having intersecting lines where one of the lines lies in a predetermined plane;
a rotatable camera having a rotational axis rotating in the predetermined plane and receiving an image of the light pattern reflected off the object;
a frame carrying said light source and said camera in a fixed geometrical relationship;
camera control means for controlling camera rotation;
normal determination means for determining a normal to the surface of the object from the image and the fixed geometrical relationship between said light source and said camera
region identification means for identifying the surfaces as separate regions and said normal determination means determining normals for the regions;
Gaussian image production means for producing a Gaussian image from the normals; and
means for comparing the Gaussian image with known Gaussian images for known objects to identify the object.

23. An apparatus for locating an object, comprising:
a light source projecting a predetermined cross light pattern having intersecting lines where one of the lines lies in a predetermined plane;
a rotatable camera having a rotational axis rotating in the predetermined plane and receiving an image of the light pattern reflected off the object;
a frame carrying said light source and said camera in a fixed geometrical relationship;
camera control means for controlling camera rotation;

image digitizing means for digitizing the image;
line finding means for finding the end points of the lines in the digitized image;
means for rotating the camera until the image of the light pattern is centered within said camera viewing range;
intersection determination means for finding the intersection of the lines in the image; and
location determination means for determining the location of the object by determining a normal to the surface of the object from the digitized image and the fixed geometrical relationship between the light source and camera.

* * * * *